Patented Jan. 6, 1953

2,624,744

UNITED STATES PATENT OFFICE 2,624,744

PRODUCTION OF MALEIC ANHYDRIDE

Joseph R. Darby, Richmond Heights, Mo., assignor to Monsanto Chemical Company, St. Louis, Mo., a corporation of Delaware No Drawing. Application November 10, 1949,
Serial No. 126,694

13 Claims. (Cl. 260—342)

This invention relates to a method of treating ferrous surfaces prior to contact with mixtures of oxygen and maleic anhydride at elevated temperatures.

The manufacture and treatment of maleic anhydride frequently involves the passage thereof in the vapor phase through steel or other equipment having iron as a base, as for example, in the catalytic vapor phase oxidation of benzene to maleic anhydride in the presence of catalysts comprising vanadium compounds. However, it is found that the yields tend to be low, particularly as compared with laboratory runs in glass or other non-ferrous equipment.

An object of this invention is to provide a method for treating steel and other ferrous equipment prior to contacting therewith at elevated temperatures mixtures of maleic anhydride and oxygen whereby oxidation and/or destruction of maleic anhydride is reduced. A particular object of this invention is to provide a method of reducing the oxidation and/or destruction of maleic anhydride during the manufacture thereof in ferrous equipment by the vapor phase oxidation of benzene.

According to the present invention, the surfaces of steel or other equipment having iron as a basic component, are treated with ammonia at an elevated temperature prior to contacting vaporized maleic anhydride therewith in the presence of oxygen at elevated temperatures. Surprisingly, it is found that the use of iron or steel equipment treated in this manner leads to far higher yields of maleic anhydride manufactured in or passed through such equipment in the vapor phase while in admixture with oxygen, especially at temperatures above 300° C.

The following examples are illustrative of the present invention, but are not to be construed as limitative thereof. Where parts are mentioned, they are parts by weight.

Example I

A stream of ammonia is passed through a mild steel tube 80 inches long and having an inside diameter of ½" for 30 hours at a temperature of 500–515° C. Thereafter a mixture of air and maleic anhydride vapor containing 20 pounds of air for each pound of maleic anhydride is passed through the tube at a temperature of 470° C. for 8 hours at a rate of 0.3 cubic feet a minute. The effluent gas is found to contain about 50% of the maleic anhydride charged.

In contrast, when the same experiment is repeated except that the steel tube is not given the pretreatment with ammonia, it is found that on passage of maleic anhydride vapor-air mixtures in the same proportions through the tube under the same conditions as in the case of the treated tube, only about 15% of the charged maleic anhydride is recovered.

Example II

Example I is repeated except that the mild steel tube is pretreated by filling it with powdered ammonium carbonate, and thereafter heating the tube for 25 hours at 400° C. while allowing excess gas to escape.

A maleic anhydride-air mixture similar to that used in Example I is passed through the treated tube under the conditions used in Example I. A yield of recovered maleic anhydride, approximately that attained in Example I, is obtained.

Example III

In this example, a thick slurry of ammonium bicarbonate in a saturated aqueous solution thereof is brushed on the interior surface of a mild steel tube ½" in inside diameter and 80 inches long. The slurry is allowed to dry and then the tube is heated at 350° C. for 40 hours while allowing excess gas to escape.

A maleic anhydride-air mixture similar to that used in Example I is passed through the treated tube under the conditions used in Example I. The yield of recovered maleic anhydride is approximately that obtained in Example I.

Example IV

Mixtures of air and benzene containing 15 pounds of air for each pound of benzene are passed at a temperature of 450° C. and at the rate of 0.3 cubic feet per minute through mild steel tubes ½" in inside diameter and 80 inches long pretreated as in Examples I, II and III, respectively, and filled with a catalyst comprising vanadium. A yield of maleic anhydride is obtained in each case, which is far higher than that obtained when an untreated tube is used.

In the pretreatment of ferrous equipment with ammonia, it is found that the effectiveness of the treatment is greatly enhanced by the use of elevated temperatures. Thus, it is generally preferred that temperatures of 300° C. or higher be used, for example, up to 700–800° C. While somewhat lower temperatures are also effective, the duration of the treatment must be appreciably lengthened, and for practical purposes temperatures in the range of 300–800° C. are employed, and preferably 400–600° C. The duration of the exposure to ammonia may be substantially varied, but for effective results an exposure of at least 1 hour and more particularly at least 5 hours is preferred particularly when temperatures of 400° C. or less are employed. At higher temperatures a somewhat shorter treatment may be used. Longer exposures may be used if desired, and serve to lengthen somewhat the duration and extent of the passifying effects which are produced.

If desired, the treating atmosphere may comprise mixtures of ammonia gas together with inert gases, as for example, nitrogen, carbon dioxide, etc. However, in order to achieve the same degree of effectiveness, it may be necessary to employ higher temperatures and/or a longer duration of exposure. Generally, it is preferred that the treating atmosphere contain at least 50% ammonia on a volume basis.

Ammonia and compounds which decompose on heating to yield ammonia may be used in the pretreatment of the invention. Examples of compounds decomposing to yield ammonia which may be used in the process of the invention include ammonium carbonate, ammonium bicarbonate, ammonium phosphate, ammonium salts of organic acids, such as ammonium acetate, propionate, octoate, stearate, phthalate, maleate, etc.

According to a preferred embodiment of the invention, the ammonium compounds are those which entirely volatilize at the treating temperature, such as ammonium carbonate. According to the particularly preferred embodiment of the invention, the ammonium compounds are volatilizable compounds which give an alkaline reaction on solution in water. Also, when ammonium compounds are used the treating temperature must be at least the temperature at which they decompose at an appreciable rate to form ammonia.

Various methods of applying ammonium compounds may be used. For example, an aqueous solution of a water-soluble ammonium compound may be brushed, sprayed or otherwise applied to the ferrous surface, allowed to dry, and then the tube heated while venting the tube in such a way as to relieve excess pressure while avoiding at least undue dilution of the ammonia with air. Depending on the solubility of the particular ammonium compound, solutions in solvents other than water may be used.

Another method of application is to apply a paste of an ammonium compound and a solvent therefor as indicated above. For example, a mild steel tube, the interior surfaces of which are thoroughly cleaned, is coated on the interior thereof with a paste of 125–150 parts by weight of ammonium carbonate and 100 parts by weight of water. A coating of this paste is applied, allowed to dry and thereafter the tube is subjected to a temperature of 300–600° C. for several hours to effect the passifying treatment while preventing escape of any more of the gaseous products than is necessary to relieve excessive pressure within the tube.

In formulating a paste of an ammonium compound and water or other solvent to be applied to a ferrous surface, the relative proportions of the two components are such as to give the desired consistency, bearing in mind the method of application, e. g., brushing or wiping, and the amount of ammonium compound which is desired to introduce per unit area of the ferrous surface. As pointed out above, in the case of ammonium carbonate from 75–125 parts by weight for every 100 parts of water represents a desirable range of proportions.

When ammonium compounds are applied in the presence of water or other solvent, it is desirable to allow most of the solvent to evaporate before vaporizing the ammonium compound.

Other methods which may be used to treat ferrous surfaces according to the present invention include contacting the surfaces with powdered ammonium compounds, such as, ammonium carbonate or mixtures of ammonium compounds and other powdered materials, such as silica, and then heating the coated surfaces at an elevated temperature for several hours to effect the passifying treatment. This may be done in the case of a tube by filling the tube with the powdered material and then heating the filled tube while venting gaseous products to avoid excessive pressure.

While the present invention is not to be construed as limited by any particular theory of operation, it is believed that the ammonia acts as an anti-catalyst or catalyst poison in its effect on the ferrous surface. Thus, it is believed that the ferrous surface or the iron therein normally acts as a total oxidation catalyst for the maleic anhydride, so that in the presence of oxygen it is rapidly and completely oxidized to carbon dioxide and water. It is believed that the action of the ammonia is such as to change the catalytic nature of the ferrous surface so as to completely, or substantially completely, destroy the destructive action thereof, although the exact nature of the change effected in the ferrous surface is not known. It appears probable that the ammonia combines in some manner with the ferrous surface to form catalytic quantities of a catalyst poison for the ferrous surface or to inhibit the catalytic action of the ferrous surface.

In general, the ammonium compounds used according to the invention are free from materials which are non-volatilizable at the treating temperature. However, the presence of inert materials, such as inert metals or metallic compounds or materials which add to the activity of any catalyst subsequently used in the equipment, such as metals or metallic compounds (e. g., where equipment for the manufacture of maleic anhydride is being treated) is not precluded.

When an external source of ammonia containing gas is employed, a stream of ammonia containing gas may be continuously passed over the surface to be treated while maintaining the desired temperature during the passifying treatment. Alternatively, all or a predominant part of the air or other gas may be swept from the surface to be treated with a stream of ammonia-containing gas and thereafter the ammonia-containing gas allowed to remain in contact with the surface which is to be treated during the heating period at the selected temperature. For example, a stream of ammonia may be used to displace the air from a ferrous tube, and thereafter the tube closed at each end to contain the ammonia during the heating period, suitable provision being made to vent excess gas, if necessary, to avoid unduly high pressures. According to a further embodiment of the invention, the ferrous apparatus to be treated may be immersed in an atmosphere of ammonia-containing gas and allowed to remain therein during the heating period.

As indicated hereinbefore, the invention is applicable to any surfaces, having iron as constituent, for example, iron, and iron alloys as, for example, such steels as carbon steels, e. g., mild, medium and hard steel, nickel steels, chrome-nickel steels, molybdenum steels, chromium steels, chrome-vanadium steels, tungsten steel, silica-manganese steels, chrome-nickel steel, high speed steel, nickel-zirconium steels, stainless steels, super steel, Silmo steel, etc., and other ferrous materials which normally cause oxidation and/or destruction of maleic anhydride in maleic anhydride-oxygen mixtures passed in contact therewith at elevated temperatures.

Ferrous equipment treated in accordance with the invention is highly useful in any process wherein mixtures containing oxygen and maleic anhydride are contained in or passed through ferrous equipment. In particular, the equipment treated according to the invention is of unexpected advantage in the manufacture of maleic anhydride by the catalytic oxidation of benzene. Thus, improved yields of maleic anhydride are achieved by treating any equipment constructed of steel or other ferrous material with which mixtures of oxygen and maleic anhydride are to be contacted, for example, converters, chambers, ducts, conduits, pipes and the like. Not only are the yields improved by pretreating the contact surfaces of such equipment in accordance with the invention but the danger of fires, explosions and excessively high temperatures is largely obviated. This is particularly the case with respect to the equipment through which the gas mixture passes at temperatures above 300° C. subsequent to the converter or reactor where the oxidation is designed to take place.

The invention is useful with respect to gaseous mixtures containing maleic anhydride and oxygen, e. g., mixtures of maleic anhydride and air having a widely varying content of maleic anhydride, e. g., 5-95% maleic anhydride. In the manufacture of maleic anhydride by the vapor phase oxidation of benzene mixtures of air and benzene containing 5-30 pounds of air for each pound of benzene may be used. The ratio of oxygen to maleic anhydride in the effluent from the converter is somewhat lower than the initial ratio of air to benzene but represents a mixture which is passed through ferrous equipment treated according to the invention with relatively little destruction of the maleic anhydride.

Tubes and/or other equipment making up the converters should be thoroughly cleaned prior to the passifying treatment of the invention. This helps to further maintain the high yields by the process of the invention. The cleaning operation may be carried out by scraping or reaming, treatment with hydrochloric or other acids followed by neutralization with a volatile base such as ammonium hydroxide, cyclohexyl amine, etc., and then drying.

The foregoing description is given in illustration and not in limitation of the invention as set forth in the appended claims.

I claim:

1. In the process of transferring a gaseous mixture comprising gaseous maleic anhydride and oxygen at an elevated temperature through an apparatus having an iron as a basic component, the step which comprises passing said mixture while at an elevated temperature above 300° C. in contact with a surface of the apparatus which has been exposed to an atmosphere comprising ammonia at an elevated temperature of at least 300° C.

2. A process as defined in claim 1 in which the surface of the apparatus is a mild steel surface.

3. A process as defined in claim 1 in which the surface of the apparatus has been rendered passive by passing a stream of ammonia over the surface at a temperature of at least 300° C.

4. A process as defined in claim 1 in which the surface of the apparatus has been rendered passive by applying a slurry comprising a volatilizable ammonium compound to the ferrous surface and thereafter heating the coated surface at a temperature of at least 300° C.

5. A process as defined in claim 4 in which the slurry is an aqueous slurry of ammonium carbonate and the ferrous surface is a mild steel surface.

6. A process as defined in claim 1 in which the surface of the apparatus is rendered passive by coating the surface with a solution of a volatilizable ammonium compound, allowing the solvent to evaporate and then heating the coated surface at a temperature of at least 300° C.

7. A process as defined in claim 1 in which the surface of the apparatus is rendered passive by coating the surface with a layer of powdered volatilizable ammonium compound and thereafter heating the coated surface at a temperature of at least 300° C.

8. In the process of manufacturing maleic anhydride by the catalytic oxidation of benzene at an elevated temperature wherein a gaseous mixture comprising gaseous maleic anhydride and oxygen is formed and comes in contact with an apparatus having an iron as a basic component, the step which comprises passing said mixture while at an elevated temperature above 300° C. in contact with a surface of the apparatus which has been rendered passive by exposure to an atmosphere comprising ammonia at an elevated temperature of at least 300° C.

9. A process as defined in claim 8 in which the surface is rendered passive by passing a stream of ammonia gas over the surface at a temperature of at least 300° C.

10. A process as defined in claim 8 in which the surface is a mild steel surface and is rendered passive by coating the surface with a slurry containing a volatilizable ammonium compound and water and heating the coated surface at a temperature of at least 300° C.

11. A process as defined in claim 10 in which the slurry is an aqueous slurry of ammonium carbonate.

12. A process as defined in claim 8 in which the surface is a mild steel surface and is rendered passive by coating with an aqueous solution of ammonium carbonate and then heating at a temperature of at least 300° C.

13. A process as defined in claim 8 in which the surface is a mild steel surface and is rendered passive by applying a layer of powdered ammonium carbonate and then heating to a temperature of at least 300° C.

JOSEPH R. DARBY.

REFERENCES CITED

The following references are of record in the file of this patent:

UNITED STATES PATENTS

| Number | Name | Date |
|--------|------|------|
| 1,941,271 | Pollock | Dec. 26, 1933 |
| 2,099,350 | Stoesser | Nov. 16, 1937 |

OTHER REFERENCES

Bullens: "Steel and Its Heat Treatment," vol. 2, p. 42 John Wiley and Sons, Inc., New York, 1948.